Dec. 1, 1953  G. BONMARTINI  2,661,250
PNEUMATIC ENDLESS TRACK FOR VEHICLES AND THE LIKE
Filed May 4, 1949

Inventor:
Giovanni Bonmartini
By Robert E. Burns
Attorney

Patented Dec. 1, 1953

2,661,250

UNITED STATES PATENT OFFICE 2,661,250

PNEUMATIC ENDLESS TRACK FOR VEHICLES AND THE LIKE

Giovanni Bonmartini, Rome, Italy, assignor to "E S T" Etablissement Sciences Techniques, Vaduz, Liechtenstein, a company of Liechtenstein Application May 4, 1949, Serial No. 91,304

Claims priority, application Italy March 3, 1949

15 Claims. (Cl. 305—10)

This invention relates to improved vehicle track devices for use when it is necessary to secure a more even distribution of the load, within a rolling system, being constructed in such manner that the tracks are in motion even on not perfectly level ground, or on soft surfaces comprising materials, such as earth, mud, sand, snow, etc.

The vehicle track of the present invention is formed by a thin-walled tube, of resilient material, possessing particular characteristics, which will be described in the following parts of this specification. The tube has an annular form and in use is mounted upon a frame, provided with two or more wheels, in such manner, that it assumes a mixed-linear form. The tube is armored with one or more flexible and inextensible elements, arranged along one or more of the generatrices of the tube.

The characteristics of the track of the invention are:

1. It has a remarkable elasticity, which permits it to adapt itself to the unevennesses of the ground, without communicating jerks or vibrations to the supporting framework.

2. It possesses a high resistance to deflection by the ground by reason of the provision of inextensible reinforcement elements.

The track of the invention is formed by a tube of, for example, cylindrical cross section, and closed upon itself to form an annulus. The tube can be embodied in a "tubular element," or, and preferably, it is provided with an inner tube, in which there is maintained a pneumatic pressure above atmospheric in such a way that the tube withstands flattening under the stress of the load imposed upon it.

The tubular track is fitted around the supporting wheels with which the supporting frame is provided, and assumes a mixed-linear form, composed of rectilinear portions connected by curves, these curves corresponding to the arcs of bending around the wheels. One of the rectilinear portions is in contact with the ground. Along the sides of the tube there are provided one or more inextensible reinforcement means such as cables formed, for example, from metal or some textile fiber with high tensile strength.

According to a practical embodiment of this invention, the inextensible cables may be positioned on the sides of the tube in diametrally opposite zones spaced apart by 90° from the inner generatrix of the tube. The purpose of the inextensible cables is to make the elastic tube capable of supporting loads and preventing at the same time any variations in its relative length.

The inextensible reinforcing members will cooperate to support the tube, within the free portions between the successive wheels. The tubular element or tire manifests both a higher flexibility and a lower resistance while it is being wound and unwound over the terminal wheels, inasmuch as both the elongations and the contractions of the outer and inner surfaces are reduced to half.

By reason of the inextensible reinforcement means, the effect of the ground is distributed all over the surface of the tubular element in contact with the ground, with obvious practical advantages.

As stated above, the tubular element comprises an air tube protected by a cover, the tube being flexible but being rendered inextensible along one or more generatrices.

The cover, which is secured around the air tube, by means of sewing, clasping, adhesive joints, or similar means can be made;

1. Of rubber or any analogous resilient material of suitable thickness. This structure is advantageous if the internal pressure is likely to be maintained between low pressure limits;

2. Of rubber or any similar resilient material reinforced by layers of fabric with weft and warp arranged diagonally with respect of the longitudinal dimension of the tube. With this structure there is obtained a remarkable flexibility in the tubular element;

3. Of rubber or analogous resilient material reinforced by a layer of fabric comprising a warp made of elastic threads arranged longitudinally and a weft made of resistant and inextensible threads parallel with the cross sections of the tube, the threads of the weft defining a plurality of contiguous loops, particularly suitable for withstanding the action exerted by the internal pressure of the air tube. At the same time the elastic threads of the warp do not stiffen the tube, permitting the latter to wind itself around the supporting wheels as well as to unwind itself therefrom with minimum friction. When the rolling of the tube occurs, the transverse loops being free can assume an inclined position with respect to one another. The extensibility of the warp, which would allow the tube to stretch itself under the effect of the pressure, is done away with, by reason of the presence of the inextensible reinforcement means arranged in the position most suitable to ensure the highest flexibility of the tubular element.

In a more generical way, and in accordance with this last mentioned variation, the tubular element is made of rubber reinforced by transverse rings formed from some inextensible material.

The invention is illustrated in the accompanying drawing, wherein.

Figure 7:
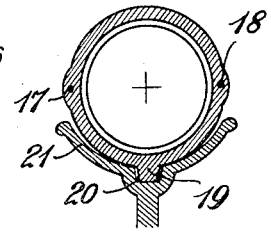
Figure 8:
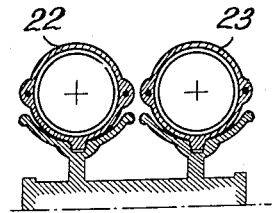

Fig. 7 illustrates in cross section a pneumatic tubular track provided with laterally arranged reinforcement elements formed from cables or heavy ropes; in this embodiment the reinforcement elements do not rest upon the rims of the wheel, but are held along an arc parallel with the wheel itself by reason of the consistency of the inflated tubular element; and Fig. 8 is a cross sectional view of a pneumatic tubular track comprising two parallel pneumatic tubes which may be either independent or connected to one another along their generatrices.

In accordance with the invention, the pneumatic tubular track-system comprises an elastic tube 1 containing an air-tube 2 in which is maintained a suitable pressure so that the tube properly withstands the flattening effect of the load imposed upon it. The pneumatic elastic track 1 is sufficiently thin to give it the necessary flexibility to meet the particular requirements of use.

Figure 1:
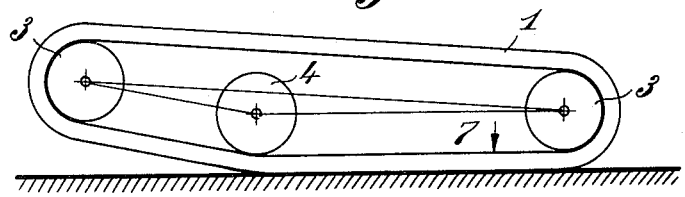
Fig. 1 shows in side elevation the shape assumed by the pneumatic tubular track upon being fitted over the two or more supporting wheels. The three-wheeled type of support, shown in this figure serves for illustrative purposes.
Figure 5:
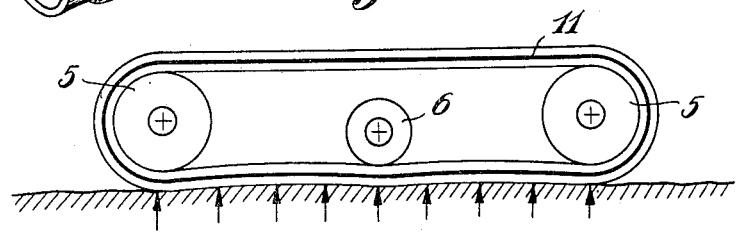
Fig. 5 is a side view of a pneumatic tubular track having a cover reinforced by fabric having elastic warp and weft comprising resisting loops, and showing the behavior of the track under the action exerted by the ground by virtue of the resisting effect produced by the inextensible ribbons or cables arranged along the lateral generatrices of the tubular element.
Figure 6:
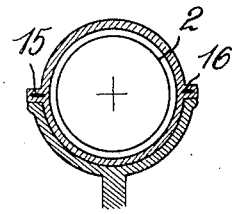
Fig. 6 shows in cross section a pneumatic, tubular track having two spaced reinforcing elements and carried on the side of the tubular element and mounted upon a deeply grooved wheel; as shown, the two reinforcing elements rest upon the rims of the supporting wheels, and are stretched over them.

The tube 2, which is a closed tube, is mounted upon the wheels 3, 4 and 5, which serve to support the undercarriage (Figs. 1 and 5) and runs on the wheels in the manner of an endless ribbon. Along the generatrices of the tube, are provided one or more closed rings made of an inextensible but flexible material such as rolled or hollow metal elements, or textile fiber of high mechanical strength. The inextensible elements can, for example, be provided along the sides of the tubular element as shown in Figs. 2, 6 and 7.

Figure 2:
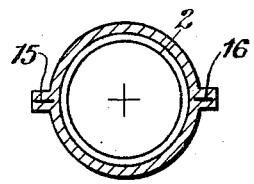
Fig. 2 is a cross sectional view of the pneumatic tubular track with two inextensible reinforcement elements inserted therein and arranged on the sides of the tubular element.

In Fig. 2, reference character 11 designates the inextensible elements arranged on the sides of the tubular element. The inextensible rings 11 prevent longitudinal stretching of the tubular element. The inextensible rings are fitted under suitable tension over the wheels of the undercarriage in such a way that they completely prevent wobbling during rolling motion. The inextensible rings 11, by virtue of the tension imparted to them, serve also to create a bridge upon which the pneumatic tube rests, between the successive wheels. In absence of such support, the portions of the pneumatic tube between the successive wheels would become curled easily under the effect of the reaction of ground and cause the load to be concentrated only at the points of contact between the ground and the wheels (Fig. 5). The length of the free extensions comprised between the successive wheels, according to this invention, may also be lessened by the provision of one or more subsidiary wheels 6 (Fig. 5).

It is necessary for the pneumatic tube to possess the highest flexibility possible, in order to ensure the easy gliding of the system during rolling motion even at high speed. Such flexibility is obtained, according to this invention, by one of the following systems, which are described hereinbelow by way of example.

Figure 3:
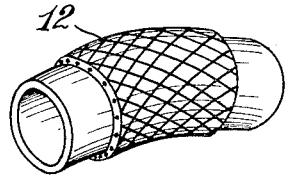
Fig. 3 is a perspective view of a portion of the tube, with a cover formed from rubber reinforced through inserts of fabric with weft and warp diagonal with respect to the longitudinal dimension of the tube.

One constructional embodiment, according to the invention is shown in Fig. 3, in which the cover is protected by one or more fabric-layers wherein the weft and warp threads are disposed diagonally with respect to the longitudinal dimension of the tube. By this means stretching of the outer surface over the arcs of the wheels will be permitted by this diagonal structure which permits the relaxation of the external fibers by virtue of the easy deformation of the small and suitably oriented rhombi.

Figure 4:
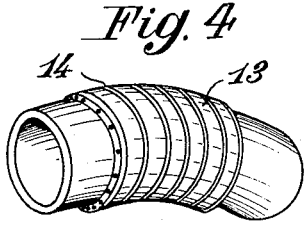
Fig. 4 shows in perspective view a portion of the tube, with a cover of rubber reinforced with a layer of fabric having a warp made of elastic threads and a weft made of resisting threads.

A further constructional embodiment, in accordance with the invention, is illustrated in Fig. 4 in which the cover is reinforced by a layer of fabric which has a warp 13 made of elastic threads (such as rubber and similar materials) and a weft 14 of inextensible threads (such as hemp, cotton, silk, synthetic textile materials, nylon) disposed parallel to the cross section of the tube. The threads of the warp constitute a structure similar to a hoop of contiguous rings, particularly adapted to withstand the effect exerted by the pressure in the interior of the tube. At the same time, the elastic threads which comprise the warp, do not stiffen the tube but permit it to bend itself around the supporting wheels and to unroll with the least friction, when the tube rolls. The transverse rings 14 are free to assume an inclined position with respect to one another and to pivot on the inextensible reinforcement elements disposed along the generatrices of the tube.

Still another constructional embodiment according to the invention is illustrated in Fig. 6 in which the reinforcement elements are disposed symmetrically on the sides of the tubular element. In one embodiment, the two reinforcement elements lie in the diametral plane of the tubular element. In the example shown in the figure, the two reinforcement elements 15 and 16 are held within the diametral plane. Nevertheless they may be placed in any point of the zone comprised in between the inner and the outer generatrices of the tube itself. As shown in Fig. 6, the edges of the supporting wheels are formed with cylindrical surfaces and the reinforcement elements rest upon and stretch over these edges.

In another embodiment, the track of the invention is formed by two, three or more tubular elements, each provided with reinforcement elements.

Still another constructional embodiment, according to the invention is shown in Fig. 7, wherein at 17 and 18 are indicated lateral reinforcement elements comprising mechanically resistant cable or rope. In this case, the inextensible elements are held along an arc parallel with the rims of the wheel without, however, being supported thereby, by virtue of the consistency of the inflated tubular element. In this arrangement, the tubular element is provided along its inner generatrix, with a ribbing 19, made of some elastic material and indented along its longitudinal extension, which engages a groove 20 suitably formed in the central portion of the groove of the supporting wheel 21, to make easier the guiding of the tubular element during its rolling motion.

In Fig. 8 is shown an arrangement in which the pneumatic tubular track is formed by the coupling of two or more parallel pneumatic tubes which may be either independent, as shown, or connected along their relative generatrix of contact, and each constructed in accordance with the foregoing embodiments.

In the embodiment shown in Fig. 8 the coupling of the two pneumatic tubes 22 and 23 is merely indicated since the multiple tube arrangement could be formed with more than two parallel elements.

The present invention has been described and illustrated with respect to preferred practical embodiments, but it will be obvious that various constructional variations may be made in the illustrative embodiments without departing from the scope of the invention as defined in the appended claims.

What is claimed is:

1. A track for track-laying vehicles comprising an endless pneumatic casing formed of material having the resilient properties of soft vulcanized rubber and flexible but inextensible reinforcement means extending longitudinally in the side walls of the casing and lying in a cylindrical surface spaced from the inner periphery of the casing and parallel to the cylindrical surface which is circumscribed by the inner periphery of the casing, the outer and inner peripheral portions of the casing being extensible and contractible in a longitudinal direction.

2. A track for track-laying vehicles comprising an endless casing formed of material having the resilient properties of soft vulcanized rubber and containing a pressure medium for exerting a substantially uniform internal pressure on the casing to keep it distended and flexible but inextensible reinforcing means extending longitudinally in the side walls of the casing and spaced from the inner periphery of the casing, the inner and outer peripheral portions of the casing being extensible and contractible in a longitudinal direction.

3. A track for track-laying vehicles comprising an endless casing formed of material having the resilient properties of soft vulcanized rubber and containing a pressure medium for exerting a substantially uniform internal pressure on the casing to keep it distended, and flexible but inextensible reinforcing means extending longitudinally in the side walls of the casing, said reinforcing means being spaced apart a distance approximately equal to the maximum width of the casing, the inner and outer peripheral portions of the casing between said reinforcing means being extensible and contractible in a longitudinal direction.

4. A track for track-laying vehicles comprising an endless casing formed of material having the resilient properties of soft vulcanized rubber and flexible but substantially inextensible reinforcing means extending longitudinally in the opposite side walls of the casing and lying in a cylindrical surface spaced approximately midway between the inner and outer peripheries of the casing and parallel to the cylindrical surface that is circumscribed by the inner periphery of the casing, the inner and outer peripheral portions of the casing being extensible and contractible in a longitudinal direction.

5. A track for track-laying vehicles comprising an endless casing formed of material having the resilient properties of soft vulcanized rubber and flexible but substantially inextensible reinforcing means extending longitudinally in the opposite side walls of the casing, said reinforcing means being located on a horizontal line that approximately bisects the cross-section of the casing, the portions of the casing on the opposite sides of said line being elastic in a longitudinal direction.

6. A truck for track-laying vehicles comprising an endless tubular casing formed of material having the resilient properties of soft vulcanized rubber, said casing being substantially circular in cross-section with outwardly projecting ribs extending lengthwise along opposite side walls of the casing and flexible but substantially inextensible endless bands extending longitudinally of the casing in said ribs, the inner and outer peripheral portions of the casing being extensible in a longitudinal direction.

7. A track for track-laying vehicles comprising an endless tubular casing formed of material having the resilient properties of soft vulcanized rubber, flexible but substantially inextensible reinforcing means extending longitudinally in the side walls of the casing and lying in a cylindrical surface spaced from the inner periphery of the casing and parallel to the cylindrical surface that is circumscribed by the inner periphery of the casing and flexible but substantially inextensible reinforcing elements comprising convolutions each disposed substantially in a right cross-section of the tubular casing, the inner and outer peripheral portions of the casing being extensible in a longitudinal direction.

8. A track for track-laying vehicles comprising an endless tubular casing formed of material having the resilient properties of soft vulcanized rubber, flexible but substantially inextensible reinforcing means extending longitudinally in the side walls of the casing and lying in a cylindrical surface spaced from the inner periphery of the casing and parallel to the cylindrical surface that is circumscribed by the inner periphery of the casing and flexible but substantially inextensible reinforcing means lying in the walls of the casing and extending in convolutions spirally about the central longitudinal axis of the tubular casing, the inner and outer peripheral portions of the casing being extensible in a longitudinal direction.

9. A track for track-laying vehicles, comprising an endless tubular casing formed of material having the resilient properties of soft vulcanized rubber, said casing having outwardly projecting ribs extending longitudinally along opposite side walls thereof and flexible but substantially intensible endless bands extending longitudinally of the casing in said ribs, and at least two spaced wheels over which said track runs, said wheels having spaced rim portions adapted to engage and support said ribs and a concave portion between said rims.

10. A track for track-laying vehicles, comprising an endless tubular casing formed of material having the resilient properties of soft vulcanized rubber, said casing having a protuberance on its inner periphery, and flexible but substantially inextensible endless bands extending longitudinally in the side walls of the casing and lying in a cylindrical surface spaced from the inner periphery of the casing and parallel to the cylindrical surface which is circumscribed by the inner periphery of the casing, the outer and inner peripheral portions of the casing being extensible and contractible in a longitudinal direction.

11. A pneumatic tubular track for track-laying vehicles comprising, in combination, a pair of flexible but inextensible cables each closed upon itself to define an endless ring, said cables being spaced apart and extending along opposite sides of said tubular track, a plurality of flexible but inextensible threads uniformly distributed longitudinally along the cables, said threads extending circumferentially between the cables and forming a plurality of contiguous loops, and highly resilient material connected continuously to said threads to define an airtight tubular pneumatic casing.

12. A pneumatic tubular track for track-laying vehicles comprising, in combination, a pair of flexible but inextensible cables each closed upon itself to define an endless ring, a plurality of flexible but inextensible threads uniformly distributed longitudinally along said cables, said threads extending circumferentially between the cables and forming a plurality of contiguous loops, and highly resilient material connected continuously to said threads to define an airtight pneumatic casing, said cables being parallel to one another and positioned on opposite sides of the said casing symmetrically with respect to the plane passing through the axis of the casing.

13. A pneumatic tubular track for track-laying vehicles comprising, in combination, a pair of flexible but inextensible cables each closed upon itself to define an endless ring, a plurality of convolutions of flexible but inextensible threads uniformly distributed longitudinally along said cables, said threads extending circumferentially between the cables and forming a plurality of contiguous loops, and highly resilient material connected continuously to said threads to define an airtight pneumatic casing, said cables being parallel to one another and positioned on opposite sides of the said casing symmetrically with respect to the plane passing through the axis of the casing and spaced apart a distance corresponding to the diameter of the casing.

14. A pneumatic tubular track for track-laying vehicles comprising, in combination, a pair of flexible but inextensible cables each closed upon itself to define an endless ring, a plurality of convolutions of flexible but inextensible threads uniformly distributed longitudinally along said cables, said threads extending circumferentially between the cables and forming a plurality of continuous loops, flexible elements disposed between adjacent loops, and highly resilient material connected continuously to said threads and to said flexible elements to define an airtight pneumatic casing, said cables being parallel to one another and positioned on opposite sides of the said casing symmetrically with respect to the plane passing through the axis of the casing.

15. A pneumatic tubular track for track-laying vehicles comprising, in combination, a pair of steel cables of equal length each closed upon itself to define an endless ring, a plurality of convolutions of flexible but inextensible material uniformly distributed longitudinally along the steel cables and lying approximately in planes perpendicular to the plane of the cables, and material having the resilient properties of soft vulcanized rubber connected to said convolutions to define an airtight pneumatic casing, said steel cables being parallel to one another and lying on opposite sides of the casing in a plane passing through the axis of the casing.

GIOVANNI BONMARTINI.

References Cited in the file of this patent

UNITED STATES PATENTS

| Number | Name | Date |
|---|---|---|
| 1,773,534 | Kegresse | Aug. 19, 1930 |
| 1,986,865 | Tschappat | Jan. 8, 1935 |
| 2,337,074 | Walker | Dec. 21, 1943 |
| 2,365,279 | Kraft | Dec. 19, 1944 |

FOREIGN PATENTS

| Number | Country | Date |
|---|---|---|
| 134,189 | Great Britain | Apr. 15, 1920 |